United States Patent [19]
Khim

[11] Patent Number: 5,233,350
[45] Date of Patent: Aug. 3, 1993

[54] APPARATUS AND METHOD FOR SERIAL PORT INTERFACING

[75] Inventor: Liow Y. Khim, Singapore, Singapore

[73] Assignee: Mediasonic Inc., Fremont, Calif.

[21] Appl. No.: 780,728

[22] Filed: Oct. 21, 1991

[51] Int. Cl.⁵ .......................... H03M 1/66; H04Q 7/00
[52] U.S. Cl. .................................. 341/144; 455/31.1; 395/325
[58] Field of Search ............. 341/144, 154, 155, 126, 341/110; 455/31.1, 38, 69, 132, 133, 140, 32.1; 370/80; 375/8; 395/325

[56] References Cited

U.S. PATENT DOCUMENTS 4,812,847 3/1989 Stewart et al. ...................... 341/154

Primary Examiner—Sharon D. Logan
Attorney, Agent, or Firm—Dennis S. Fernandez

[57] ABSTRACT

Apparatus 70 interfaces between port 20 of personal computer 10 and peripheral device 40 connectable to port 20. Transmit and receive data signals (TXD, RXD) are transmitted and received between port 20 and device 40 to pass through without substantial modification by apparatus 70. Protocol signals are transmitted by port 20 and processed to provide digital data signals. The protocol signals include a Request To Send (RTS) signal and a Data Terminal Ready (DTR) signal, whereby the apparatus processes RTS signal to provide a protocol clock signal and processes DTR signal to provide a protocol data signal. The protocol signals are monitored to identify a protocol signal pattern. Upon identifying such pattern within a particular protocol signal, a particular digital data signal is extracted from the protocol signal. The extracted digital data signal may then be converted to analog signals which are applicable to produce sound from speaker 80.

8 Claims, 5 Drawing Sheets

APPARATUS AND METHOD FOR SERIAL PORT INTERFACING

BACKGROUND OF THE INVENTION

1. Field of the Invention

This invention relates to computer systems, particularly to apparatus and method for interfacing devices to ports of personal computers.

2. Description of the Background Art

As personal computer systems are designed with added performance and functionality, there is a resulting need to provide additional input and/or output (I/O) ports for accessing the system processor. This need may arise when additional peripheral devices, such as digital-to-analog converters (DACs) for producing sound, for instance, are coupled to the system. Typically, data are accessed either serially or in parallel through standard I/O or communications ports using conventional synchronous or asynchronous protocol (i.e., "hand-shaking.")

Data access through existing or additional ports may be limited, however, as so-called "laptop" and "notebook" personal computers having added performance and functionality are designed more compactly and with fewer components. Accordingly, it is desirable to provide a compact, high-performance personal computer having improved system access.

SUMMARY OF THE INVENTION

The invention resides in interfacing an apparatus between a port of a personal computer and a peripheral device connectable to such port, where transmit and receive data signals are transmitted and received to pass through between the port and the device without substantial modification by the apparatus, and protocol signals which are transmitted by the port are processed to provide digital data signals.

Preferably, the protocol signals include a Request To Send (RTS) signal and a Data Terminal Ready (DTR) signal, such that the apparatus processes the RTS signal to provide a protocol clock signal and processes the DTR signal to provide a protocol data signal. In addition, the apparatus monitors the protocol signals to identify a protocol signal pattern; and upon identifying such pattern within a particular protocol signal a particular digital data signal is extracted from the protocol signal. The extracted digital data signal may then be converted to analog signals which are applicable to produce sound from a speaker.

DESCRIPTION OF THE PREFERRED EMBODIMENT

Figure 1:
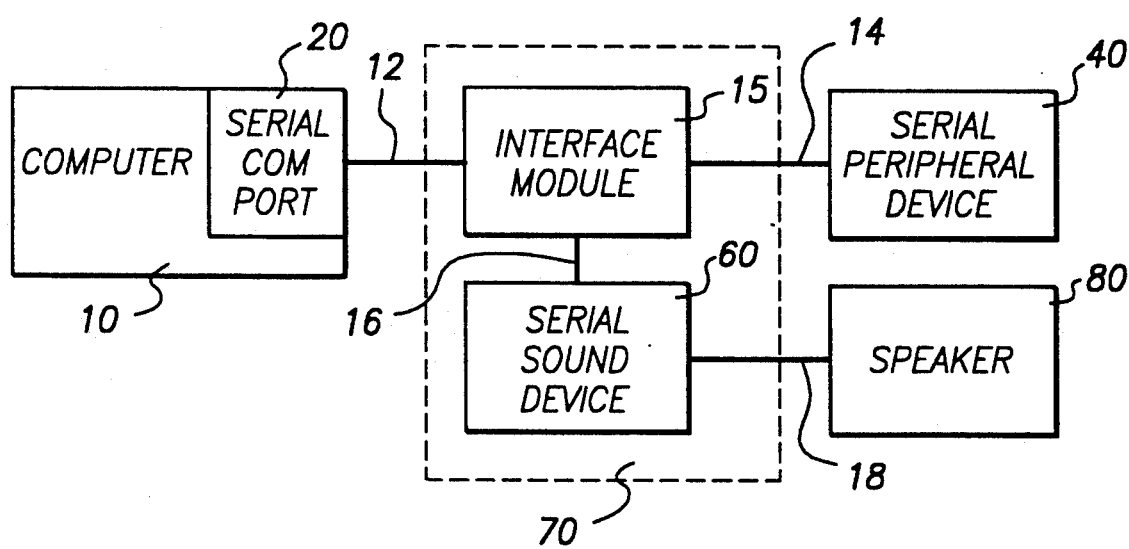
FIG. 1 is a block diagram of interface apparatus 70 which includes interface module 15 and serial sound device 60. Apparatus 70 is shown coupled to serial communications port 20 of personal computer 10, serial peripheral device 40, and speaker 80.

FIG. 1 shows interface apparatus 70 which includes interface module 15 and serial sound device 60. Apparatus 70 is coupled to serial communications port 20 of personal computer 10, serial peripheral device 40, and speaker 80. The system of FIG. 1 is shown in perspective view in FIG. 2.

In accordance with an essential aspect of the present invention, apparatus 70 interfaces between port 20 and peripheral device 40 which is connectable to port 20, whereupon transmit data (TXD) and receive data (RXD) signals are transmitted and received by apparatus 70 between port 20 and peripheral device 40 to pass through without substantial modification, and protocol signals which are transmitted by port 20 are processed to provide digital data signals, such provided digital data signals thereby improving system access.

Preferably, the protocol signals include a Request To Send (RTS) signal and a Data Terminal Ready (DTR) signal, such that apparatus 70 processes the RTS signal to provide a protocol clock signal and processes the DTR signal to provide a protocol data signal. In addition, apparatus 70 monitors the protocol signals to identify a protocol signal pattern. Upon identifying such pattern within a particular protocol signal, a particular digital data signal is extracted from the protocol signal. The extracted digital data signal may then be converted to analog signals which are applicable to produce sound from speaker 80.

Since conventional data access through standard ports of personal computers (i.e., I/O, communications, and printer ports) proves to be limiting or inadequate for user needs as laptop or notebook computers, which are physically more compact, yet incorporate greater functionality and higher performance, the present invention is directed to providing a method and apparatus which improves access to such systems.

In particular, data access is improved by effectively sharing existing ports with certain serial devices coupled thereto (i.e., modems, mouses, etc.) Port sharing may be accomplished by transmitting and receiving data and clock signals through unused port lines or bit paths which are normally reserved for standard communications protocol or so-called "hand-shaking" purposes.

Thus, for some serial devices which function properly while electrically coupled to a standard port of a personal computer system, but without necessarily using all of the port's predefined protocol signal lines (i.e., Request To Send (RTS), Data Terminal Ready (DTR), Clear To Send (CTS), Data Set Ready (DSR), or Carrier Detect (DCD)), these protocol lines, if so unused, are available for data communication by other devices with the computer system, thereby permitting a common port to be shared with other serial devices.

Figure 2:
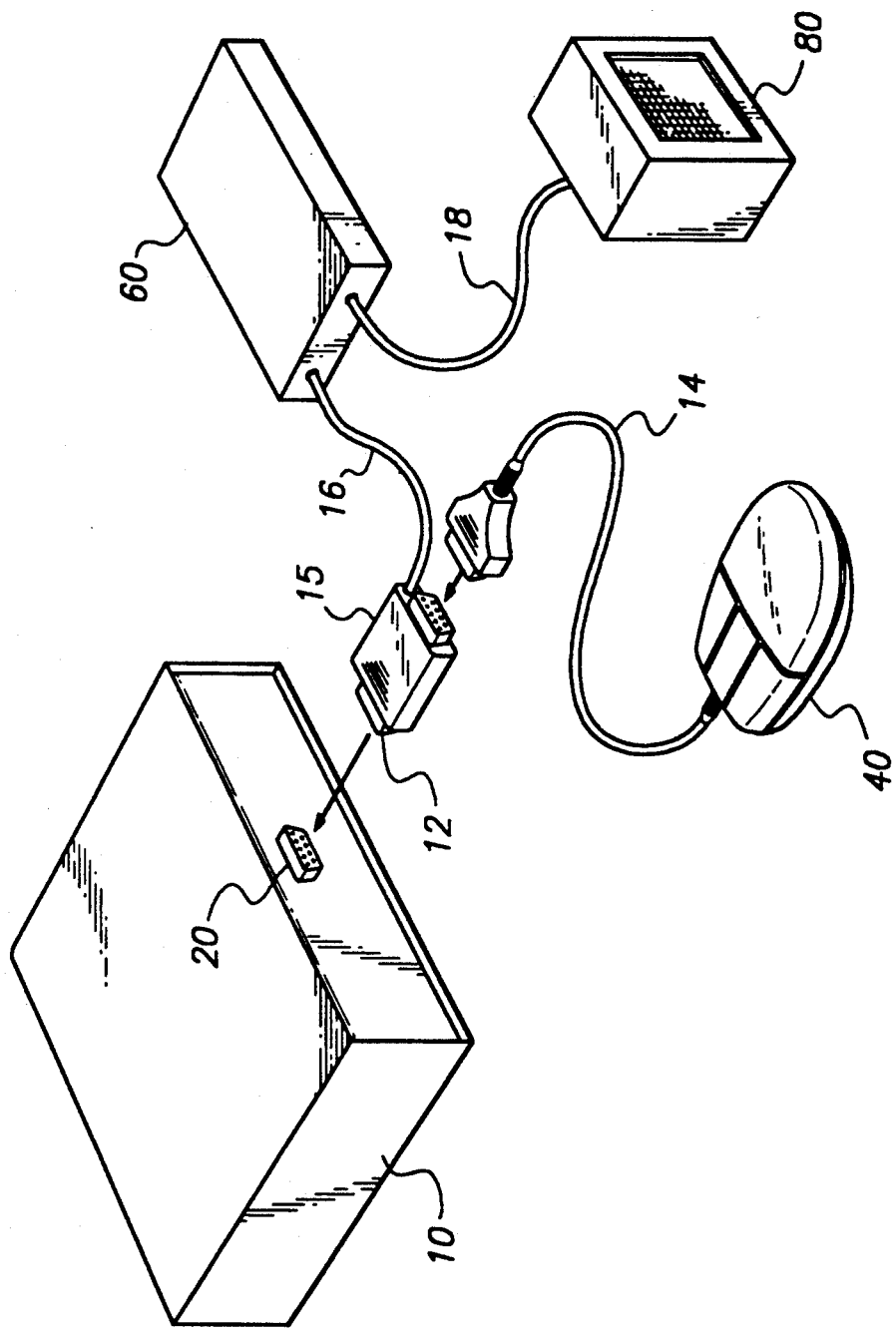
FIG. 2 is a perspective view of the system in FIG. 1.
Figure 3:
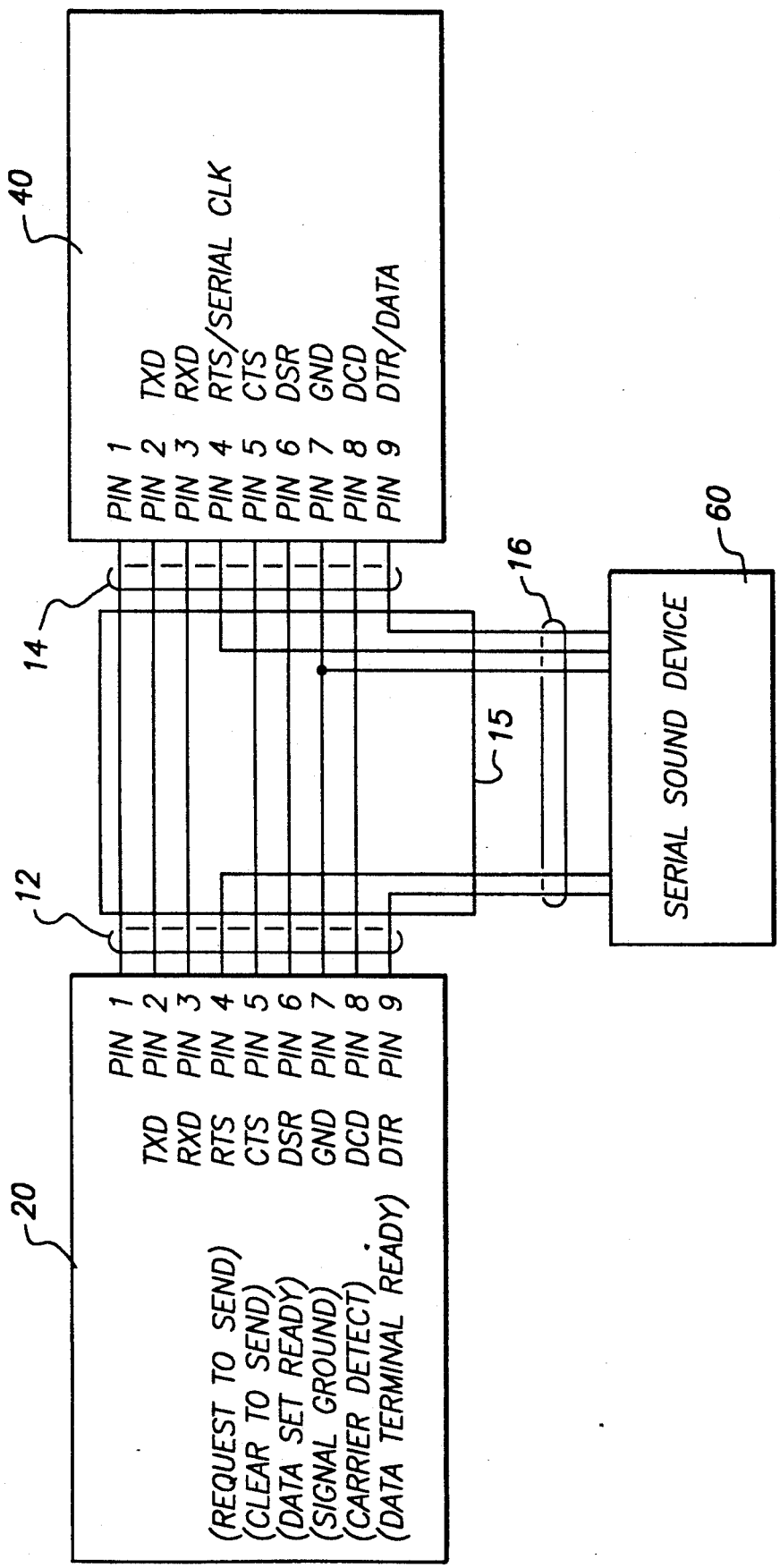
FIG. 3 is a block diagram of interface module 15 showing electrical interconnections to port 20, sound device 60 and peripheral device 40.

In the preferred embodiment, peripheral device 40 shares communications port 20 of personal computer 10 with sound device 60. As shown in FIG. 2, device 40 is a mouse, however, it may be any type of serial device including a modem. Port sharing is possible through interface module 15, which is illustrated in FIG. 3 in a 9-pin component configuration to show its electrical interconnections to port 20, sound device 60 and peripheral device 40.

It is contemplated that module 15 may be assembled as well in various component packaging having different pin configurations. Module 15 is adapted for interconnection with computer 10 through bus 12 and port 20, which is a standard RS-232 port. Moreover, module 15 is adapted for interconnection through another port, preferably RS-232, to couple electrically peripheral device 40 through bus 14. Additionally, module 15 is adapted for interconnection with sound device 60 through bus 16.

It is further contemplated that module 15 and sound device 60 may be assembled physically within one chassis or package such that apparatus 70 is provided as a single integrated unit.

Buses 12, 14 are configured to contain standard signal bits which are typically required for data communication through conventional RS-232 ports. As configured in FIG. 3, buses 12, 14 include TXD and RXD signals which couple respectively to pins 2, 3 of port 20 and peripheral device 40.

In accordance with an essential aspect of the present invention, TXD and RXD signals are transmitted and received by module 15 to pass through between port 20 and peripheral device 40 without substantial electrical modification of such signals by apparatus 70. Similarly, undefined signal on pins 1, CTS signal on pins 5, DSR signal on pins 6, ground signal (GND) on pins 7, and DCD signal on pins 8 are included in and pass through buses 12, 14 and module 15 without substantial modification.

Bus 16 includes RTS signal coupled to pin 4 and DTR signal coupled to pin 9 of port 20, and RTS/SERIAL CLK signal coupled pin 4 and DTR/DATA signal coupled to pin 9 of peripheral device 40. Bus 16 also includes GND signal coupled to pins 7 of port 20 and peripheral device 40, such that module 15 and sound device 60 are coupled thereto.

Thus, when interconnected with port 20 of personal computer system 10, module 15 functions as a by-pass adaptor for signal paths, such as TXD and RXD signal lines, which are used by peripheral device 40. More importantly, module 15 also functions to access or "tap" unused signal paths, such as DTR and RTS signal lines, for use by other serial peripheral devices, e.g., to transmit and receive clock and/or data signals to and from the system processor.

Figure 4:
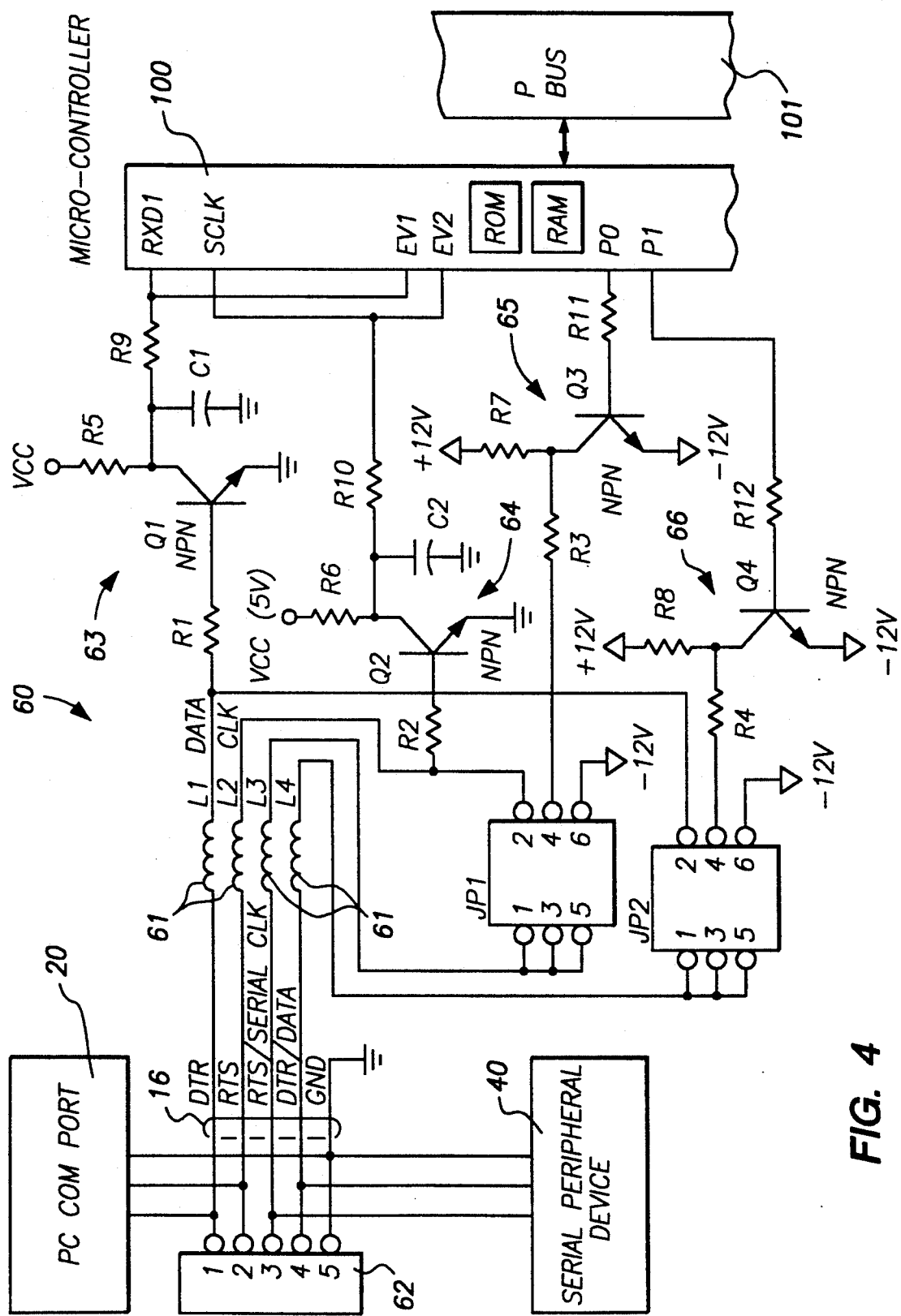
FIG. 4 is a schematic diagram of a portion of sound device 60 showing electrical interconnections to port 20 and peripheral device 40.

In FIG. 4, a portion of sound device 60 is shown electrically interconnected to port 20 and peripheral device 40, implicitly through module 15 (not shown). Loads L1-L4 which couple sound device 60 to bus 16 serve to filter inductively DTR, RTS, RTS/SERIAL CLK, DTR/DATA signal lines. Optionally, module 15 may include 5-pin access port 62 for auxiliary access or direct by-pass to DTR, RTS, RTS/SERIAL CLK, DTR/DATA and GND signal lines.

When coupled to module 15, sound device 60 may access DTR and RTS signals to process and provide therefrom digital data signals, such as protocol clock signal (CLK) and protocol data signal (DATA) respectively. CLK and DATA signals are monitored by microcontroller 100 to identify a unique digital signature contained therein, which is transmitted by computer 10 through a predefined discrete signal burst or periodic signal pattern. Microcontroller 100 is coupled to parallel or "P" bus 101, and is preferably a Mitsubishi M37450 microcontroller which includes built-in Read Only Memory (ROM), Random Access Memory (RAM), and serial-to-parallel converter.

Microcontroller 100 receives inverted DATA signal at pins RXD1 and EV1 since DATA signal passes through inverter circuit 63, which includes transistor Q1, capacitor C1, and resistors R1, R5 and R9. Similarly, microcontroller 100 receives inverted CLK signal at pins SCLK and EV2 since CLK signal passes through inverter circuit 64, which includes transistor Q2, resistor R6, capacitor C2, and resistors R2, R6 and R10.

Microcontroller pins EV1 and EV2 correspond to input ports for 16-bit event counter within microcontroller 100. Such event counter functions to identify or recognize the unique signature pattern contained within a particular protocol signal, i.e. CLK or DATA signal as accessed by sound device 60 respectively from DTR or RTS signal, by intermittently counting digital signal streams received at pins EV1, EV2.

Preferably, a 150-us window of identifiably-unique digital signal pulses is sent through DATA signal to pin EV1, followed by a corresponding pulse stream of particular digital data signals which is then extracted or parsed-out by microcontroller 100 to be provided, preferably synchronously with CLK signal, by computer 10 to $P$ bus 101 of sound device 60.

Sound device 60 may be configured through user-switchable 6-pin jumpers JP1, JP2 to control access by peripheral device 40 to certain protocol signals accessed by sound device 60, i.e., DTR, RTS signals. Output pins 1, 3 and 5 of jumper JP1 provide RTS/SERIAL CLK signal to bus 16, through load L3. Output pins 1, 3 and 5 of jumper JP2 provide DTR/DATA signal to bus 16, through load L4.

In jumper JP1, input pins 2, 4 and 6 receive respectively CLK signal, level-shifted inverted P0 signal from microcontroller 100 (i.e., due to P0 signal passing through inverter circuit 65, which includes transistor Q3 and resistors R11, R7 and R3) and a logic "low" level −12 volt signal. With regard to jumper JP2, input pins 2, 4 and 6 receive respectively DATA signal, level-shifted inverted P1 signal from microcontroller 100 (i.e., due to P1 signal passing through inverter circuit 66, which includes transistor Q4 and resistors R12, R8 and R4) and a logic "low" level −12 volt signal. Level-shifting of inverted signals P0, P1 provides higher drive RTS/SERIAL CLK, DTR/DATA signals externally to sound device 60.

For both jumpers JP1 and JP2, pins 1 and 2 are switchable to provide direct by-pass, pins 3 and 4 are switchable "on" such that signals P0 and P1 of microcontroller 100 function to control respectively RTS/SERIAL CLK and DTR/DATA signal transmissions, and pins 5 and 6 are switchable to disable RTS/SERIAL CLK and DTR/DATA signal transmissions to peripheral device 40.

Figure 5:
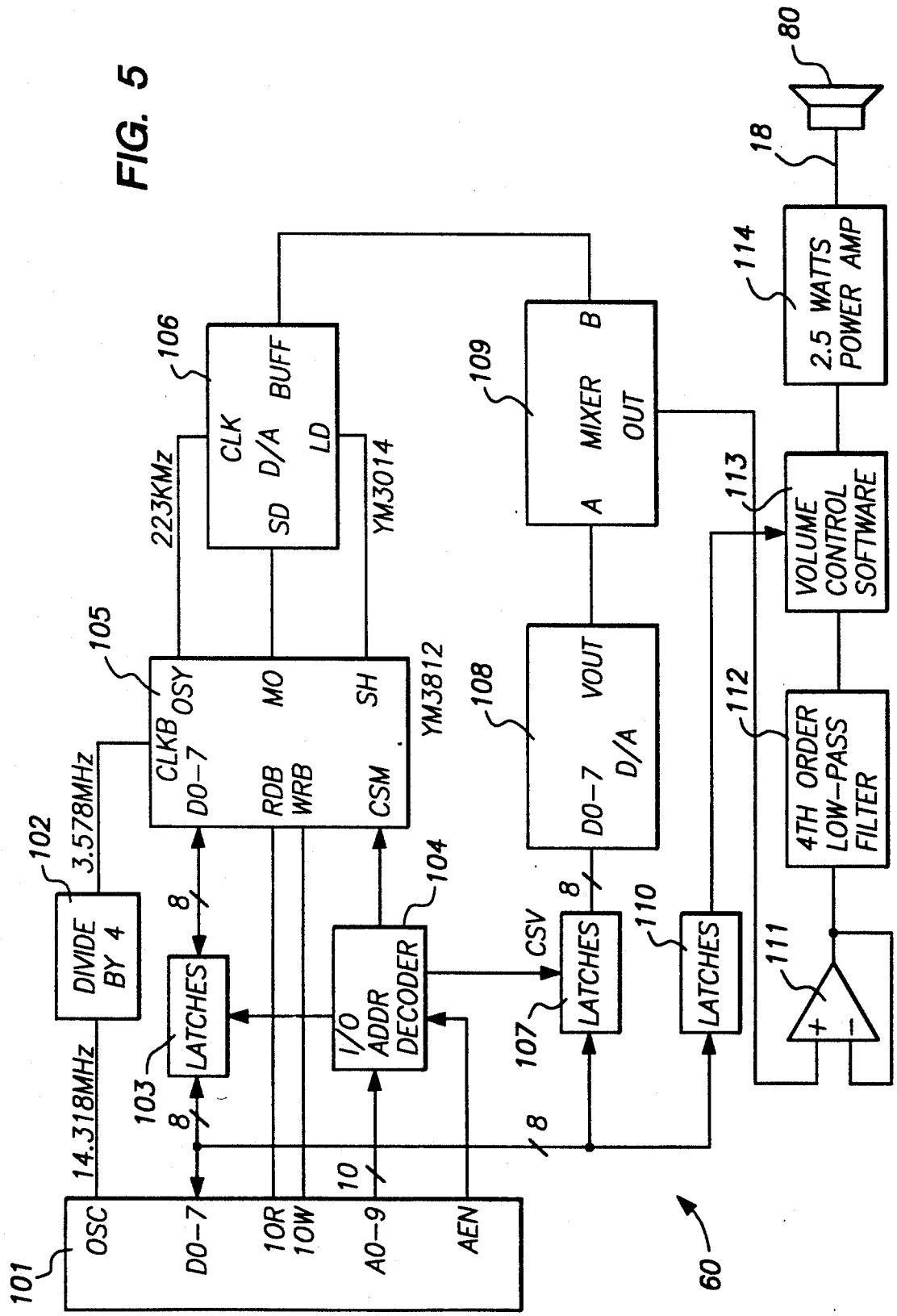
FIG. 5 is a schematic diagram of a portion of sound device 60 showing electrical interconnection to speaker 80.

FIG. 5 shows schematically optional portions of sound device 60 which may be coupled between P bus 101 and speaker 80, such that digital data signals which are extracted from "unused" protocol signal lines of port 20 are then converted to analog sound signals which are applicable to speaker 80.

Extracted digital data signal are obtained from P bus 101 preferably in 8-bit form (D0-7) and latched onto latches 103, 107 and 110. Data in latch 103 are applied synchronously to Frequency Modulation (FM) music circuitry including circuit (YM3812) 105, which receives 3.578 MHz clock through Divide-by-4 circuit 102 from a 14.318 MHz OSC clock line of AT bus 101. FM circuit 105 also receives read and write signals 10R, 10W from microcontroller 100 which are applied respectively to read and write pins RDB, WRB. Moreover, I/O Address Decoder circuit 104 which receives 10-bit address information (A0-9) and Address Enable (AEN) signal from P bus 101 applies decoded control signals to latches 103, 107 (at Chip Select Voice (CSV) pin) and FM circuit 105 at Chip Select Music (CSM) pin.

When operating, FM circuit 105 provides various digital output signals including a 223-KHz pulse signal which is applied to CLK input of Digital-to-Analog (D/A) converter circuit 106, a music output (MO) signal which is received by circuit 106 at digital signal (SD) input, and shift (SH) signal which is applied to load (LD) pin of circuit 106. Circuit 106 then provides buffer analog output (BUFF) signal, thereby providing synthesized sound signals.

In addition to applying latched digital data signals to FM music circuitry, sound device 60 applies such data signals to voice DAC circuitry which outputs sound signals corresponding to pre-recorded digitized sounds, including special sound effects, human speech, and animal sounds. In this regard, 8-bit latched data from latch 107 are received by 8-bit D/A converter to produce analog sound output (VOUT) which is applied to input A of mixer circuit 109. Mixer circuit 109 also receives analog BUFF signal from D/A circuit 106 to produce mixed output signal (OUT).

OUT signal is amplified by buffer amplifier 111 and then filtered by 4th-Order Low-Pass Filter 112. Volume Control Software circuit 113, which functions to control volume through gain of power amplifier 114 coupled thereto according to hardware volume knob control inputs and software control inputs through digital data in latch 110, receives filtered OUT signal from filter 112 and provides volume-controlled OUT signal to power amplifier 114. Finally, power amplifier 114 which has a maximum output of 2.5 watts provides speaker output signal 18 to speaker 80.

What is claimed is:

1. An apparatus for interfacing between a serial port of a computer and a device connectable to said serial port, said apparatus comprising:
   first means coupled to said serial port and said device, for receiving and transmitting transmit and receive data signals between said serial port and said device without reception and transmission substantially modifying said transmit and receive data signals; and
   second means, coupled to said first means, for receiving protocol signals transmitted from said serial port, said second means monitoring said protocol signals for a signature pattern, and upon detection of said signature pattern, said second means extracting data signals from said protocol signals and outputting said extracted data signals.

2. The apparatus of claim 1, wherein said protocol signals comprise a Request to Send (RTS) signal and a Data Terminal Ready (DTR) signal; and wherein said second means processes said RTS signal to provide a protocol clock signal and processes said DTR signal to provide a protocol data signal.

3. The apparatus of claim 1, further comprising a third means coupled to said second means for converting said extracted data signals to analog signals which are applicable to produce sound from a speaker device.

4. An apparatus for interfacing between a serial port of a computer and a device connectable to said serial port, said apparatus comprising:
   first means coupled to said serial port and said device, for receiving and transmitting transmit and receive data signals between said serial port and said device without reception and transmission substantially modifying said transmit and receive data signals;
   second means coupled to said first means, for receiving protocol signals transmitted from said serial port, said second means monitoring said protocol signals for a signature pattern, and upon detection of said signature pattern, said second means extracting data signals from said protocol signals and outputting said extracted data signals;
   third means coupled to said second means for converting said extracted data signals to analog signals which are applicable to produce sound from a speaker device;
   wherein said protocol signals comprise a Request To Send (RTS) signal and a Data Terminal Ready (DTR) signal; and wherein said second means processes said RTS signal to provide a protocol clock signal and processes said DTR signal to provide a protocol data signal.

5. A method for interfacing between a serial port of a computer and a device connectable to said serial port, said method comprising the steps of:
   receiving and transmitting transmit and receive data signals between said serial port and said device without substantially modifying said transmit and receive data signals;
   receiving protocol signals transmitted from said serial port;
   monitoring said protocol signals for a signature pattern;
   upon detection of said signature pattern within a particular monitored protocol signal, extracting data signals from said protocol signals; and
   outputting said extracted data signals.

6. The method of claim 5, wherein said received protocol signals comprise a Request To Send (RTS) signal and a Data Terminal Ready (DTR) signal and wherein said RTS signal is processed to provide a protocol clock signal and said DTR signal is processed to provide a protocol data signal.

7. The method of claim 5, further comprising the step of converting said extracted data signals to analog signals which are applicable to produce sound from a speaker device.

8. A method for interfacing between a serial port of a computer and a device connectable to said serial port, said method comprising the steps of:
   receiving and transmitting transmit and receive data signals between said serial port and said device without substantially modifying said transmit and receive data signals;
   receiving protocol signals transmitted from said serial port;
   monitoring said protocol signals for a signature pattern;
   upon detection of said signature pattern within a particular monitored protocol signal, extracting data signals from said protocol signals;
   outputting said extracted data signals; and
   converting said extracted data signals to analog signals which are applicable to produce sound from a speaker device;
   wherein said received protocol signals comprise a Request To Send (RTS) signal and a Data Terminal Ready (DTR) signal and wherein said RTS signal is processed to provide a protocol clock signal and said DTR signal is processed to provide a protocol data signal.

* * * * *